United States Patent Office
3,647,589
Patented Mar. 7, 1972

3,647,589
METHOD OF MANUFACTURING RUBBER WEAR COVER FOR ROLLERS AND METHOD OF APPLYING SAME
Alois Peter Felden, Munich, Germany, assignor to Stahlgruber, Otto Gruber & Company, Munich, Germany
Filed June 23, 1970, Ser. No. 49,057
Claims priority, application Germany, June 26, 1969, P 19 32 320.7
Int. Cl. B32b 31/00
U.S. Cl. 156—165        5 Claims

ABSTRACT OF THE DISCLOSURE

A rubber cover for protecting conveyor belt rollers and return idlers is characterized by an outer wear resistant vulcanized rubber layer and an inner connecting layer of unvulcanized cold vulcanizable rubber mixture.

BACKGROUND OF INVENTION

Figure 1:
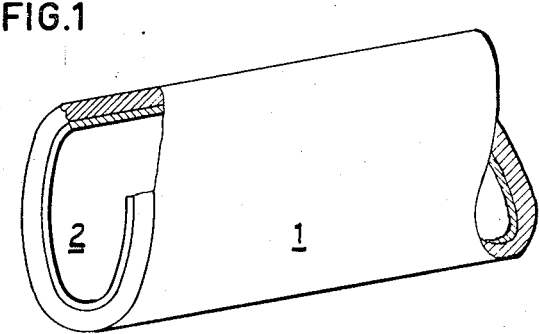

This invention relates to wear and corrosion protection for conveyor belt supporting rollers and return idlers. Such rollers are often provided with coatings or coverings, e.g. ceramic covering or a protective layer applied by means of hot vulcanization.

The purpose of these coverings is to protect the actual roller material. Eventually the covering, per se, becomes worn out and then has to be replaced. Both with respect to the original equipment as well as the replacements, it is necessary with the various types of coverings to disassemble the rollers and to send them to the manufacturer to apply the coverings. It is obvious that this is cumbersome and results in considerable costs.

In order to remedy this disadvantage, it has been suggested to apply a rubber coating or covering in situ by means of the cold vulcanization process, the conveyor belt rollers being provided with an adhesive layer and being applied to the rubber plates or rubber pieces. This method leads to a buffer edge, proceeding more or less in the longitudinal direction of the roller jacket, with the edge representing a fault cause, since here may easily occur a split into which moisture and dirt may penetrate and from which may start cracking which eventually may lead to premature destruction of the protective coating or even a complete separation of same.

Finally, it has also been attempted to draw directly upon the conveyor belt roller, a tube-shaped rubber sleeve whose inside diameter was undersized as compared to the roller diameter. Due to the elastic expansion of the sleeve, resulting from the pulling on, to the measurement of the roller, there occurs a stress in the rubber which at first assures good friction contact and consequently a firm fit.

According to experience, after a relatively short operating time, however, the elasticity of the rubber declines as a result of the extreme stress, i.e. the rubber cover is stretched, and the result is that lacking an adhesive or glue bonding, the cover slips on the roller, something which leads to its early destruction. On the other hand, it was impossible up to now to provide the extruded, tube-shaped rubber covers, vulcanized in an autoclave, with a bonding layer of the known type, vulcanized by means of the cold vulcanizing process, for which reason such covers may only then be securely applied when they are vulcanized directly on the roller at the manufacturing plant.

SUMMARY OF INVENTION

The object of this invention, therefore, is to provide a method of applying tube-shaped covers upon conveyor band supporting rollers and return idlers, whereby a durable bonding between roller and cover is achieved without having to treat the roller in a special operation. Specifically the bond between the roller and the cover occurs by means of cold vulcanization.

Accordingly, the invention relates to a tube- or pipe-shaped rubber cover which serves as the wear protection for the conveyor belt supporting rollers and return idlers, which is characterized by an outer wear-resistant layer consisting of vulcanized rubber and an inner connecting layer consisting of unvulcanized, cold-vulcanizable rubber mixture.

Since such a connecting layer was impossible with the previous preparation processes of tubular shaped rubber covers, the invention also relates to a process for the preparation of a tubular shaped rubber cover of the above-mentioned type which is characterized in that first there is applied on a core, corresponding to the inside diameter of the cover, a thin layer consisting of unvulcanized, vulcanizable rubber mixture containing either sulfur or accelerator as a vulcanizing agent and thereover a further layer of an unvulcanized rubber mixture containing sulfur and accelerator. Then the thusly-coated core is exposed in a vulcanizing device to the effects of heat, and as the case may be, to pressure and the outer layer is thereby vulcanized.

Since, in order to assure a firm fit of the cover on the roller, the novel rubber cover is preferably made with an inside diameter which is smaller than the outside diameter of the roller to be covered, difficulties result in the drawing upon the roller. Accordingly, in order to provide the conveyor belt supporting rollers and return idlers in a simple and yet durable manner with a wear-resistant coating, part of the present invention is also a process for the drawing on of a novel cover upon such conveyor belt rollers. This process is characterized in that first the roller is provided with a layer of a rubber-metal glue and after its drying with a second glue application, while the connecting layer is coated in the interior of the rubber cover with a vulcanizing liquid or paste which contains the component missing from the rubber mixture of the connecting layer, i.e. containing either accelerator or sulfur. Then prior to drying the second glue application and the vulcanizing liquid or paste, the rubber cover—while its diameter is expanded—is pushed over the end of the roller and is closed at the other end, whereupon in the interior of the rubber cover there is produced an excess pressure. This pressure effects an expansion slightly over the outside diameter of the roller, whereupon the coating may be drawn over the total length of the roller in order to have it adhere tightly against the roller surface after releasing the excess pressure and in the further process to enter into a rubber-metal vulcanizing bonding.

THE DRAWINGS

Figure 2:
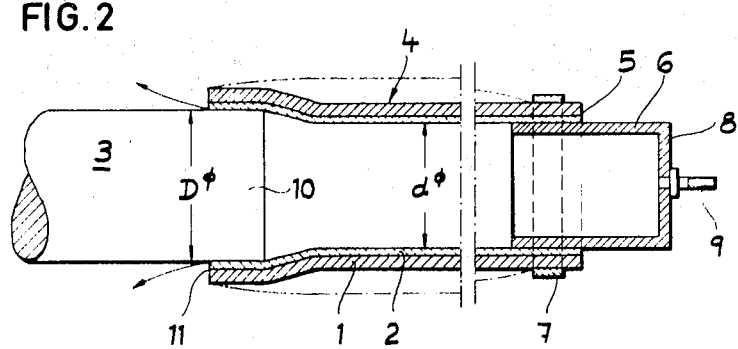

FIG. 1 is a perspective view partly in section of a novel tube-shaped rubber cover; and FIG. 2 is a longitudinal section through a novel cover, during the drawing on operation.

DETAILED DESCRIPTION

In the tube-shaped rubber coating illustrated in FIG. 1, the outer wear-resistant layer 1 consists of vulcanized rubber, while the connecting layer 2 provided in the interior of the hose, consists in a known manner of unvulcanized, vulcanizable rubber, whose premature vulcanization is avoided by the omission of a vulcanization component. This layer accordingly contains neither sulfur nor accelerator.

Since it is basically well known in repair technology of rubber objects, including conveyor belts, to employ repair material whose main layer consists of vulcanized rubber and which has a cold-vulcanizable connecting layer of the above-described type, it was obvious to utilize this method in the manufacture of a wear-resistant protection for conveyer belt supporting rollers and return idlers, and in fact this was carried out also in the already described process, according to which a rubber plate is placed around the roller.

This process was unsuccessful, however, because of the already described disadvantages. While on the other hand it is impossible with conventional methods to provide a tube, extruded from a ring nozzle, inside with an unvulcanized connecting layer which remains unvulcanized in the usual heating in the autoclave.

Here the novel process of this invention is put into action. This novel process deviating from the customary, consists of not extruding a tube-shaped cover—not as a finished tube part—but thinly coating a cylindrical core, corresponding to the inside diameter of the tube, first with unvulcanized, vulcanizable rubber of a type which only contains ether sulfur or accelerator, preference being given to an accelerator-free mixture containing sulfur. The application of the layer may occur by wrapping with thin strips, or preferably by placement of a respectively prefinished cut in the shape of a rectangular rubber plate.

This thin connecting layer is then covered with a thicker wear-resistant layer consisting of a rubber mixture, which contains both sulfur as well as accelerator, and therefore may be vulcanized under the effects of heat and, as the case may be, of pressure. The application of this wear-resistant layer occurs in the same manner as that of the connecting layer, i.e. preferably there is placed a rectangular cut of a rubber plate around the connecting layer, although a covering narrow rubber strip or a brushing on of plastic rubber substance is also possible.

The core coated or covered in such a manner is placed into a vulcanizing mold whose mold cavity corresponds to the outer jacket of the tube shaped rubber cover. The mold is then heated in a known manner to the vulcanization temperature, the wear-resistant layer being vulcanized, while the connecting layer, due to the lack of one of the components required for vulcanization, remaining unvulcanized.

If desired, not only the mold, but also the core may be heated accordingly in order to achieve a quick vulcanizing of the relatively thick wear-resistant layer.

The novel rubber covers, also in contrast to the usual process, are not continuously extruded and then cut to length but instead are finished individually with the diameter provided for and the desired length.

For better adhesion on the roller to be covered, an inside diameter is preferably chosen which is somewhat smaller than the diameter of the roller, as this is already known in the tube covers employed without bonding with the roller surface. In these instances, the drawing on of the covering is difficult, since due to the expansion of the rubber tube during the drawing on, there occurs great friction which hinders the sliding on operation.

Here the novel process is particularly useful for the pulling on of the rubber cover, as is later illustrated in FIG. 2. It is noted, however, that both the application of rubber-metal glues and vulcanizing pastes or liquids, to obtain a firm bonding between an unvulcanized connecting layer and a metal surface, as well as the pulling on of a tube-shaped covering with the aid of excess pressure, expanding the cover (even if without the achievement of an adhesive bonding), are known per se. Accordingly, the scope of this invention is intended to apply to the total combination of the characteristics defined in the appended claims.

As clearly indicated in FIG. 2, the outside diameter D of the conveyer belt roller 3 is larger than the diameter $d$ of the covering, which is generally designated with the reference numeral 4.

The roller is first provided with an application of a rubber-metal glue or adhesive which is then permitted to dry. After the complete drying of the first application, there follows a second application, while nearly simultaneously, i.e. immediately before or after this second glue application, connecting layer 2 of covering 4 is provided on the roller with an application of a vulcanizing paste or liquid which contains the missing vulcanizing component, i.e. sulfur or preferably accelerator.

Immediately thereafter or, as the case may be, already shortly before, into end 5 of cover 4 is inserted a tubular piece 6 for a short distance therein. The tubular piece 6 in its outside diameter corresponds somewhat to the inside diameter $d$ of cover 4, so that it may easily be inserted therein. A tight connection between the tubular piece and the cover may be achieved with the aid of a connecting hose 7.

The tubular piece 6 is unilaterally closed off by end plate 8 into which a valve 9 is inserted, which may be constructed just as or similar to a tire valve.

As long as the glue or vulcanization agent applications on the roller and the connecting layer are still moist, covering 4 is pushed up a short distance on the end 10 of roller 3 while being expanded, and the valve 9 is connected with a non-illustrated compressed air line. The excess pressure now setting in, in the interior of the cover, effects its expansion up to about the outline illustrated by dotted lines, air escaping at end 11 of the cover as indicated by arrows.

This expansion of the cover and the air cushion which is formed at least in places by the air between the roller surface and the connecting layer 2, permits the cover to be pushed on the roller without difficulty. The roller is provided with a still moist glue cover until one end of the cover is flush with the corresponding frontal surface of the roller, whereupon the compressed air supply is interrupted. The connected hose 7 is released and the tube piece 6 may be removed from end 5 of the cover.

The cover, now relieved of pressure, contracts due to the elasticity of its material and places itself rigidly around the conveyer belt roller, whereupon its connecting layer enters into a rubber-metal vulcanization bonding with the roller material.

It is apparent that the above-described method of the drawing on requires a greater length of the coating, as compared to the roller length, with the excess length being determined by the inserted part of the tube piece 6. The projecting length, remaining after the removal of the tube piece, must of course be cut off flush with the corresponding frontal surface at end 10 of roller 3. As used in the claims the term "roller" is intended to mean a conveyer belt roller or a return idler.

What is claimed is:

1. A process for preparing a tubular rubber cover for use as protection against wear for a roller, characterized in applying a thin inner layer of unvulcanized vulcanizable rubber on a core corresponding to the inside diameter of the cover, the inner layer containing a single vulcanizing agent, applying a further outer layer of unvulcanized rubber mixture containing both sulfur and an accelerator over the inner layer, and exposing the covered core to vulcanizing means to vulcanize the outer layer.

2. A process as set forth in claim 1 wherein the vulcanizing agent in the inner layer is sulfur.

3. A process as set forth in claim 1 wherein the vulcanizing agent in the inner layer is an accelerator.

4. A process for securing a tubular rubber cover on a metal roller for use as protection against wear of the roller, characterized in applying a first coat of rubber-metal adhesive to the outer surface of the roller, permitting the first coat to dry, applying a second coat of rubber-metal adhesive to the outer surface of the roller, substantially simultaneously with the application of the second coat also applying a vulcanizing agent to the interior of a tubular rubber cover having an inner layer of unvulcanized vulcanizable rubber mixture which previously lacks the vulcanizing agent, prior to the drying of the second adhesive coating and of the curing of the vulcanizing agent expanding the diameter of the rubber cover, pushing one end of the expanded cover over the end of the roller while closing the opposite end of the cover, producing an excess pressure upon the interior of the cover to an expansion of the cover wherein the inside diameter thereof is at least slightly greater than the outside diameter of the roller, drawing the cover over the entire length of the roller, releasing the excess pressure to tightly adhere the cover to the roller surface, and subsequently effecting a rubber-metal vulcanization bond between the roller and cover.

5. In the process of claim 4 wherein the cover is first made by applying a thin inner layer of unvulcanized vulcanizable rubber on a core corresponding to the inside diameter of the cover, the inner layer containing a single vulcanizing agent other than the later applied vulcanizing agent, applying a further outer layer of unvulcanized rubber mixture containing both sulfur and an accelerator over the inner layer, and exposing the covered core to vulcanizing means to vulcanize the outer layer.

References Cited
UNITED STATES PATENTS

| | | | |
|---|---|---|---|
| 2,257,025 | 9/1941 | Schuster | 29—130 X |
| 1,736,911 | 11/1929 | Gray | 156—187 |
| 2,333,800 | 9/1943 | Lewis et al. | 156—187 X |
| 2,721,601 | 10/1955 | Spencer | 156—165 |

CARL D. QUARFORTH, Primary Examiner

R. E. SCHAFER, Assistant Examiner

U.S. Cl. X.R.

156—187, 195, 294, 190; 29—130